Patented Aug. 11, 1936

2,050,882

UNITED STATES PATENT OFFICE 2,050,882

AUTOMATIC CIRCUIT BREAKER SYSTEM

Alan S. FitzGerald, Wynnewood, Pa., assignor to General Electric Company, a corporation of New York Application March 10, 1933, Serial No. 660,268

13 Claims. (Cl. 175—294)

My invention relates to automatic circuit-breaker systems suitable for application to direct- or alternating-current circuits and more particularly to such systems in which all mechanical relays, switches, and moving parts are eliminated, and the desired control is effected by electric-valve circuits.

The present application is a continuation-in-part of my copending application, Serial No. 530,887, filed April 17, 1931, and assigned to the same assignee as the present application.

Heretofore, there have been devised numerous arrangements including electromagnetic and mechanical relays, switches and other moving parts for effecting the operation of a circuit breaker interconnecting a supply circuit and a direct- or alternating-current load circuit. Many of these arrangements of the prior art are extremely complicated and involve the use of moving parts and contacts, which are subject to wear and deterioration in use, and very sensitive mechanical and electrical devices, which require frequent calibration, all of which result in relatively high maintenance costs.

It is an object of my present invention to provide an improved automatic circuit-breaker system including electric valves which will overcome the disadvantages of the arrangements of the prior art and which will be simple and reliable in operation.

It is another object of my invention to provide an improved automatic circuit-breaker system including electric valves in which all moving parts and contacts are completely eliminated.

It is a further object of my invention to provide an improved automatic circuit-breaker system including electric valves by means of which a direct- or alternating-current load circuit may be disconnected from its supply circuit after a predetermined time interval and reconnected thereto after another predetermined time interval.

In accordance with one embodiment of my invention, a load circuit is connected to a supply circuit through a circuit-interrupting means, preferably comprising a pair of electric valves each provided with a control grid. The grid potentials of the electric valves, which normally have a phase relation with respect to the anode potentials of the valves such that the valves are fully conductive, are shifted to substantially phase opposition with respect to their anode potentials in response to predetermined abnormal load conditions. This shift in phase of the grid potentials is accomplished by means of a pair of auxiliary electric valves operating upon a phase-shifting circuit controlling the grids of the main electric valves. In order to impart a definite time delay to the operation of the circuit-interrupting means, the grids of the auxiliary electric valves are excited with a potential across a capacitor which is charged at a fixed predetermined rate upon the occurrence of predetermined abnormal conditions on the load circuit, this rate being independent of the magnitude of the abnormal conditions. The circuit-interrupting means may be reclosed after a predetermined time interval by discharging the capacitor at a predetermined rate, as through a resistor.

For a better understanding of my invention, together with other and further objects thereof, reference is had to the following description taken in connection with the accompanying drawing, and its scope will be pointed out in the appended claims. The single figure of the drawing illustrates my invention as applied to an automatic circuit-breaker system for controlling the interconnection of a direct-current load circuit and an alternating-current supply circuit.

Referring now to the drawing, I have illustrated an arrangement for controlling the connection and disconnection of a load circuit 10 and a source of alternating current 11. The load circuit 10 is illustrated as a direct-current circuit energized from the circuit 11 through a full-wave rectifier comprising a transformer 12 and electric valves 13 and 14, although it will be apparent that electric valves 13 and 14 may be reversely connected in parallel in a well-known manner in case it is desired to energize the load circuit 10 with alternating current. It will also be understood that the supply and load circuits may be interconnected by means of any suitable circuit-interrupting apparatus, in which case the operation of such means will be controlled by the electric valves 13 and 14. Electric valves 13 and 14 are each provided with an anode, a cathode, and a control grid, and may be of any of the several types well known in the art, although I prefer to use valves of the vapor-electric discharge type in which the magnitude of the current transmitted by the valves is independent of the magnitude of the grid potential, assuming only that the grid potential is more positive than the critical value which is necessary for maintaining the valves non-conductive. This type of valve is sometimes referred to in the art as a grid glow tube. The conductivity of valves of this type may be readily controlled by impressing alternating potentials upon the grids and anodes of the valves and varying the phase Aug. 11, 1936.    A. S. FITZ GERALD    2,050,882
AUTOMATIC CIRCUIT BREAKER SYSTEM
Filed March 10, 1933
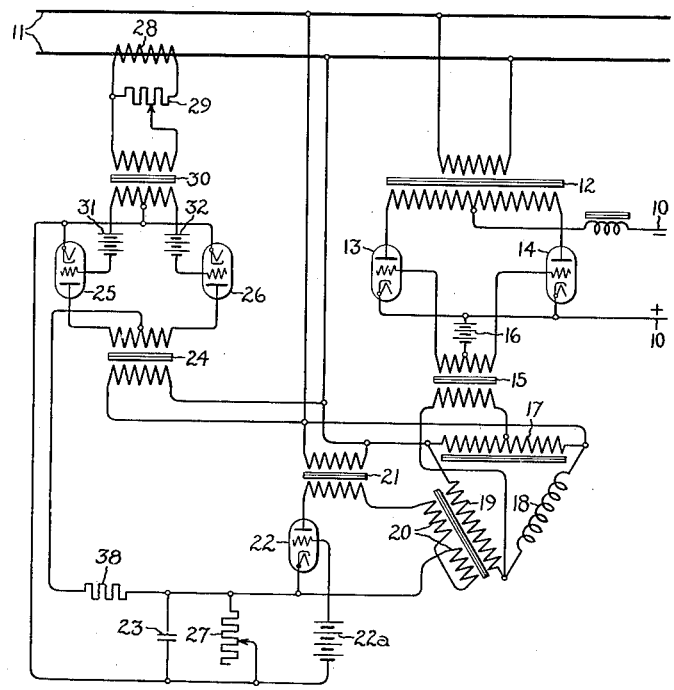
Inventor:
Alan S. FitzGerald,
by  Charles E. Tullar
His Attorney.

that the load circuit is thereafter reconnected to the supply circuit after another predetermined interval of time.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. In a protective system, an electric circuit, a circuit interrupter therefor, energy storage means, means responsive to a predetermined abnormal condition on said circuit for varying the energy stored in said storage means at a rate independent of the magnitude of said abnormal condition, and means responsive to a predetermined storage of energy in said storage means for operating said interrupter.

2. In a protective system, a supply circuit, a load circuit, means including an electric valve interconnecting said ciruits, energy storage means, means responsive to a predetermined abnormal condition of one of said circuits for varying the energy stored in said storage means at a rate independent of the magnitude of said condition, and means responsive to a predetermined storage of energy in said storage means for rendering said valve non-conductive to disconnect said circuits.

3. In a protective system, a supply circuit, a load circuit, means interconnecting said circuits including an electric valve provided with a control grid, phase-shifting means for exciting said grid from one of said circuits normally to render said valve conductive, a condenser, means responsive to a predetermined overload on said load circuit for charging said condenser at a rate independent of the magnitude of said overload, a second electric valve, means for varying the conductivity of said second valve in accordance with the charge on said condenser, said phase-shifting means being controlled by said second electric valve to render said first valve non-conductive to disconnect said circuits upon the persistence of said overload for a predetermined length of time.

4. In a protective system, an electric circuit, a circuit interrupter therefor, a condenser, means responsive to an overload on said circuit for varying the charge upon said condenser during said overload at a rate independent of the magnitude of said overload, and means responsive to a predetermined charge upon said condenser for operating said interrupter when said overload continues for a definite time interval.

5. In a protective system, an electric circuit, a circuit interrupter therefor, an electric discharge device, means responsive to an overload on said circuit for causing said device to pass a current of a magnitude independent of the magnitude of said overload, and means controlled by said current for operating said interrupter when said overload continues for a definite time interval.

6. In a protective system, an electric circuit, a circuit interrupter therefor, an electric discharge device, means responsive to an overload on said circuit for causing said device to pass a current of a magnitude independent of the magnitude of said overload, a second electric discharge device, means responsive to said current for varying a controlling quantity of said second device, and means responsive to a predetermined condition of energization of said second device for operating said interrupter when said overload continues for a definite time interval.

7. In a protective system, an electric circuit, a circuit interrupter therefor, an electric discharge device, energy storage means, means responsive to an overload on said circuit for causing said device to vary the condition of energization of said storage means at a rate independent of the magnitude of said overload, and means responsive to a predetermined condition of energization of said storage means for operating said interrupter when said overload continues for a definite time interval.

8. In a protective system, an electric circuit, a circuit interrupter therefor, an electric discharge device, means responsive to an overload on said circuit for causing said device to pass a current of a magnitude independent of the magnitude of said overload, a condenser, means for varying the charge upon said condenser at a rate determined by said current, and means including a second electric discharge device, responsive to the charge upon said condenser for operating said interrupter when said overload continues for a definite time interval.

9. In a protective system, an electric circuit, a circuit interrupter therefor, a grid glow tube, means responsive to an overload on said circuit for controlling said tube to pass a current of a magnitude independent of the magnitude of said overload, a condenser, means, including a resistor, for varying the charge upon said condenser at a rate determined by said current, and means including an electric discharge device, responsive to the charge upon said condenser, for operating said interrupter when said overload continues for a definite time interval.

10. In a protective system, an electric circuit, a circuit interrupter therefor, a grid glow tube, a resistor, an alternating-current source connected in series relationship to said tube and said resistor, means including the grid of said tube for causing said tube to become conducting upon the occurrence of an overload on said circuit, a condenser connected in parallel relationship to said resistor, and means responsive to a predetermined charge upon said condenser for operating said interrupter when said overload continues for a definite time interval.

11. In a protective system, an electric circuit, a circuit interrupter therefor, an electric discharge device having a control element, said device being of a type in which an electric discharge may be started in response to a predetermined electrical condition of the control element and in which the magnitude of the discharge is independent of the electrical condition of the control element, means including said control element for initiating a discharge in said device upon the occurrence of an overload on said circuit and for interrupting said discharge upon the cessation of said overload, and means responsive to cumulative action of said discharge for operating said interrupter if said overload continues for a definite time interval.

12. In a protective system, an electric circuit, a circuit interrupter therefor, an electric discharge tube containing an ionizable medium and having a control element, said tube being of a type in which ionization of said medium is started in response to a predetermined electrical condition of the control element and is maintained by a discharge current in the tube, an alternating-current source for energizing said tube, means including said control element for initiating a pulsating discharge in said tube upon the occurrence of an overload on said circuit, and means responsive to cumulative action of said discharge for operating said interrupter if said overload continues for a definite time interval.

13. In a protective system, an electric circuit, circuit-interrupting means operable to electrically complete and interrupt said circuit, an electric discharge device containing an ionizable medium and having a control element, said device being of a type in which ionization of said medium is started in response to a predetermined electrical condition of said control element and is maintained by a discharge current in the device, a source of non-continuous voltage for energizing said device, means including said control element for initiating a discharge current in said device in response to a predetermined electrical condition of said circuit and means responsive to cumulative action of said discharge current for modifying the control of said circuit-interrupting means.

ALAN S. FITZGERALD.